(12) United States Patent
Streeter et al.

(10) Patent No.: US 7,991,883 B1
(45) Date of Patent: Aug. 2, 2011

(54) SERVER COMMUNICATION IN A MULTI-TIER SERVER ARCHITECTURE

(75) Inventors: Kevin Streeter, San Francisco, CA (US); Stephen Cheng, Foster City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 165 days.

(21) Appl. No.: 12/335,491

(22) Filed: Dec. 15, 2008

(51) Int. Cl.
*G06F 15/16* (2006.01)
*G06F 15/173* (2006.01)

(52) U.S. Cl. ......... 709/224; 709/203; 709/217; 709/223

(58) Field of Classification Search .................. None
See application file for complete search history.

(56) References Cited

U.S. PATENT DOCUMENTS

| | | | |
|---|---|---|---|
| 6,047,327 A | 4/2000 | Tso et al. | |
| 6,151,624 A | 11/2000 | Teare et al. | |
| 6,167,438 A | 12/2000 | Yates et al. | |
| 6,751,673 B2 | 6/2004 | Shaw | |
| 6,889,385 B1 | 5/2005 | Rakib et al. | |
| 7,039,048 B1 | 5/2006 | Monta et al. | |
| 7,062,567 B2* | 6/2006 | Benitez et al. | 709/231 |
| 7,127,720 B2 | 10/2006 | Cano et al. | |
| 7,133,922 B1 | 11/2006 | She et al. | |
| 7,139,811 B2 | 11/2006 | Lev et al. | |
| 7,302,490 B1 | 11/2007 | Gupta et al. | |
| 7,437,364 B1 | 10/2008 | Fredricksen et al. | |
| 7,668,901 B2* | 2/2010 | Franke et al. | 709/203 |
| 2001/0045962 A1 | 11/2001 | Lee et al. | |
| 2002/0078174 A1 | 6/2002 | Sim et al. | |
| 2003/0101238 A1 | 5/2003 | Davison | |
| 2003/0108030 A1 | 6/2003 | Gao | |
| 2003/0225857 A1* | 12/2003 | Flynn et al. | 709/217 |
| 2003/0233451 A1 | 12/2003 | Ludvig et al. | |
| 2004/0090970 A1 | 5/2004 | Sanchez et al. | |
| 2005/0038877 A1 | 2/2005 | Gupta et al. | |
| 2006/0195589 A1* | 8/2006 | Vaitl | 709/227 |
| 2006/0248212 A1 | 11/2006 | Sherer et al. | |
| 2007/0130585 A1 | 6/2007 | Perret et al. | |
| 2007/0206590 A1* | 9/2007 | Baek et al. | 370/389 |
| 2007/0283043 A1* | 12/2007 | Kiyohara et al. | 709/243 |
| 2008/0181107 A1 | 7/2008 | Moorthi et al. | |
| 2008/0222281 A1* | 9/2008 | Dilley et al. | 709/223 |
| 2009/0028148 A1* | 1/2009 | Cao et al. | 370/390 |
| 2010/0082804 A1* | 4/2010 | Patel et al. | 709/224 |

OTHER PUBLICATIONS

Shetty et al.; U.S. Appl. No. 11/263,652, filed Oct. 31, 2005, entitled Network Configuration with Smart Edge Servers, 37 pages, to be published by USPTO (M119).

Shetty et al.; U.S. Appl. No. 11/527,817, filed Sep. 27, 2006, entitled Automatic Live Stream Trees, 20 pages, to be published by USPTO (M129). Rubin, Blake J., Examiner, U.S. Patent Office, U.S. Appl. No. 12/338,531, filed Dec. 18, 2008, Office Action, dated Oct. 18, 2010, 19 Pages.

Hunter, William E., U.S. Appl. No. 12/338,531, filed Dec. 18, 2008, Amendment in Reply to Office Action of Oct. 18, 2010, to be published by USPTO at allowance, 12 Pages.

Office Action in U.S. Appl. No. 12/338,531 mailed Jan. 6, 2011, 22 pages.

* cited by examiner

*Primary Examiner* — Joshua Joo
(74) *Attorney, Agent, or Firm* — Fish & Richardson P.C.

(57) ABSTRACT

A computer-implemented method including receiving, at a server, a first request for content; determining whether the content is available locally at the server; when the content is available locally at the server, retrieving the content locally at the server; and transmitting the content to at least one downstream server; and when the content is not available locally at the server, transmitting, to the at least one downstream server, a notification that the content is not available locally and that a second request for the content is being transmitted; and transmitting the second request for the content to at least one upstream server.

33 Claims, 6 Drawing Sheets

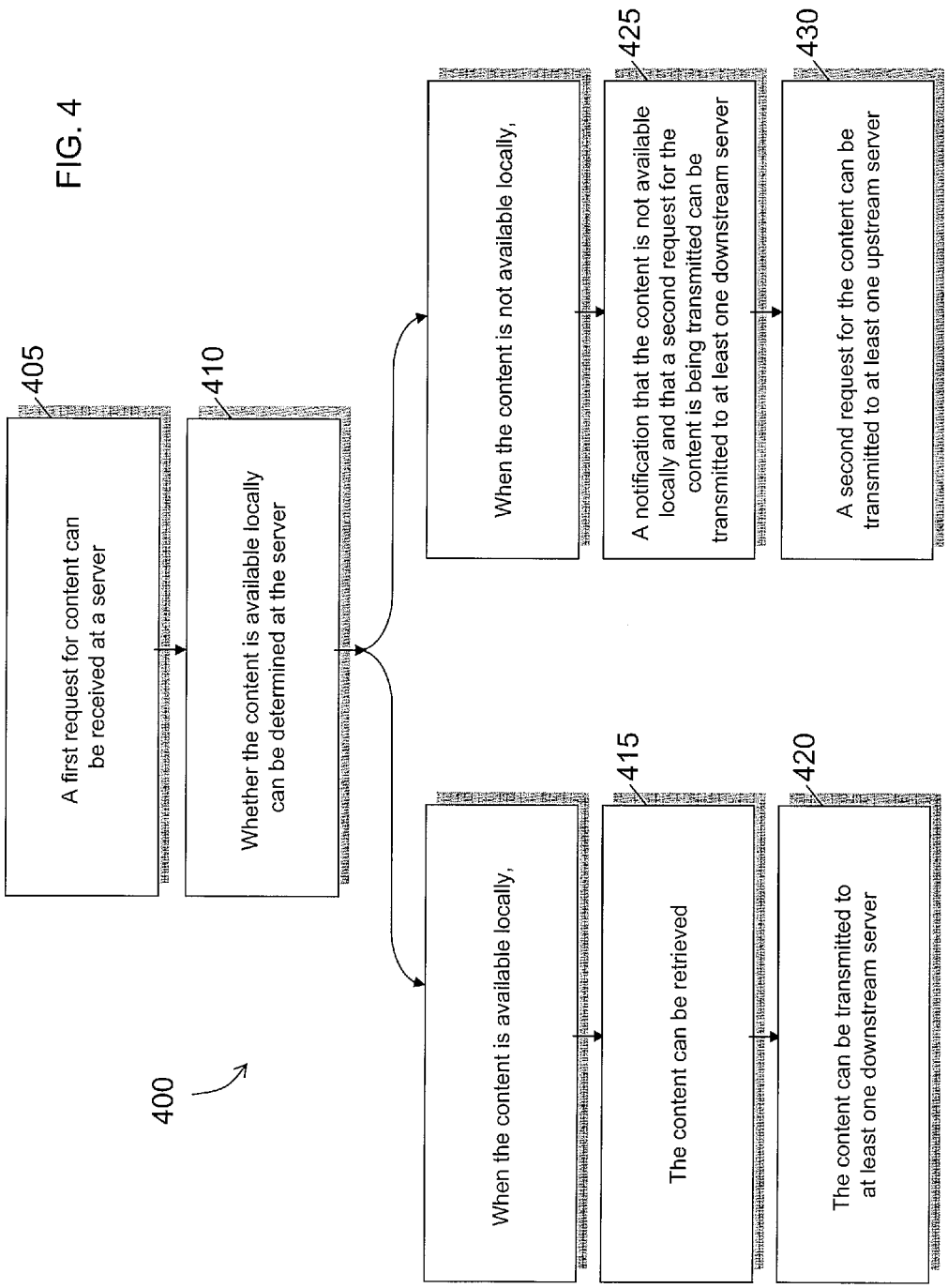

SERVER COMMUNICATION IN A MULTI-TIER SERVER ARCHITECTURE

TECHNICAL FIELD

The present disclosure relates to server communication in a multi-tier server broadcasting system.

BACKGROUND

Video on demand (VOD) and audio on demand technologies allow users to select and view/listen to video or audio content at their convenience. On demand systems can be implemented to stream content, which allows a user to view/listen as the content is being streamed, or to download content to a device, such as a computer or digital video recorder (DVR), for viewing/listening at any time. A DVR is a device that records video and audio content in a digital format to a disk drive or other memory medium within the device. DVRs include software for personal computers which enables video content capture and playback to and from the memory medium. DVRs can provide the user with functionality, including play, pause, stop, fast-forward and rewind. Such functionality can enable a user to pause a live video content stream for viewing at a later time. Alternatively, a user can record the live video content stream using the DVR and can playback the recorded video content at any time. DVR functionalities also include enabling a user to seek backwards and forwards within the content stream to view previously played and yet unplayed content.

Many internet service providers (ISPs) offer VOD streaming, whereby a user buys or selects video content and it begins to play almost instantaneously, and/or downloading to a DVR for viewing in the future. VOD streaming is a one-way video transmission over a data network, including the Internet, used to play video clips and video broadcasts. Unlike VOD downloading, whereby movie files are played after the entire file has been downloaded and stored, VOD streaming enables videos to be played shortly after only a small amount of content has been received. VOD can also be employed through a two-tier client-server software architecture model. In a client-server relationship, one computer program, the client, makes a service request from another computer program, the server. The server can provide services to the client computer and its users. Several standard network functions, such as email exchange, web access and database access are based on the client-server model. In addition to the standard network functions, the client can request VOD streaming and/or downloading from the server.

SUMMARY

This specification describes technologies relating to server communication in a multi-tier server architecture. In general, content can be distributed over interconnected network nodes that can selectively transmit, receive, store and display the content. The interconnected network nodes can either be server or client data processing apparatuses, e.g., computers. The server computers can be organized in a multi-tiered server architecture, where ingest servers, e.g., origin servers, reside at the top level and one or more intermediate and/or edge servers reside at one or more lower levels. Client computers can be connected to the multi-tiered server architecture through bottom level servers, e.g., edge servers. Users operating client computers and downstream servers can transmit requests for recorded content and/or live datastream broadcast content to upstream servers. Upstream servers can determine whether the requested content is available locally. When the requested content is available locally, the upstream servers can transmit the requested content downstream through the multi-tier server architecture to the downstream servers and/or client computers. When the requested content is not available locally, the upstream servers can transmit a continuation message, e.g., an unavailability notification, to the downstream servers and also can transmit a new request for the content to one or more additional upstream servers. An upstream server that fails to transmit the requested content and/or the continuation message can be identified as a non-responsive and/or failed server. Upon identifying the non-responsive upstream server, a computer system can alert a multi-tier server system administrator to server failure problems, can notify downstream servers and/or client computers, can implement failover to a functional upstream server, can replace the upstream server with a functional upstream server and/or can re-route the multi-tier server communication network connections to circumvent the failed upstream server.

In one aspect a computer-implemented method for communicating between servers in a server system includes receiving, at a server, a first request for content. Determining whether the content is available locally at the server. When the content is available locally, the content is retrieved and the content is transmitted to at least one downstream server. When the content is not available locally, a notification is transmitted that the content is not available locally and that a second request for the content is being transmitted. When the content is not available locally the second request for the content is transmitted to at least one upstream server.

This and other aspects, can be implemented in systems and computer program products, encoded on a computer-readable medium, operable to cause data processing apparatus to perform such operations and can include one or more of the following features. Periodically, additional notifications can be transmitted to the at least one downstream server until the content is retrieved. The additional notifications can be transmitted to prevent a time out failure at the server receiving the first request for content. A third request for content can be transmitted to another server where neither the content nor the additional notification is transmitted by the at least one upstream server within the time out failure limit of the server receiving the first request for content. The at least one upstream server that failed to transmit the content and the additional notification within the time out failure limit of the server receiving the first request for content can be identified. The upstream server can be more proximal to an origin server than the server receiving the first request for content. The upstream server can include the origin server. The downstream server can be more distal from the origin server than the server receiving the first request for content. Transmitting the notification can include transmitting the notification to each downstream server requesting the content. Transmitting the notification can include transmitting the notification to each downstream server. Transmitting the notification to each downstream server can be based on determining whether a number of downstream servers requesting the content exceeds a threshold value. The notification can be transmitted to each downstream server if the threshold value is exceeded.

Particular implementations of the subject matter described in this specification can be implemented to realize one or more of the following advantages. Transmitting notifications to one or more downstream servers can prevent the transmitting server from experiencing a time out failure. The notifications can inform the one or more downstream servers that requested content is not available locally and that a second request for the content is being transmitted. Transmitting notifications to one or more downstream servers can prevent the one or more downstream servers from experiencing a time out failure. In addition, transmitting notifications to one or more downstream servers can automatically extend the time out failure limits of the transmitting server and/or the one or more downstream servers. Further, time out failure limits can be configurable.

Additionally, a request for content to an upstream server can be re-transmitted to another upstream server where neither the requested content nor a notification is transmitted from the upstream server within the prescribed time out limit. The requesting server can transmit a notification informing a computer system that the upstream server is non-responsive. Identifying non-responsive servers can enable a computer system to implement failover to a functional server. Further, identifying non-responsive servers can enable the computer system to alert a system administrator and to re-route traffic and/or reconfigure communication network connections in a multi-tier server architecture to circumvent the non-responsive server.

In addition, identifying non-responsive servers can enable the computer system to notify downstream servers and/or client computers that a failure has occurred. The notification to downstream servers and/or client computers can occur without implementing failover to a functional server. Moreover, informing the computer system that an upstream server is non-responsive can enable the computer system to isolate failed network connections in the multi-tier server architecture. Therefore, if the computer system implements failover to a functional server, the remainder of the network connections will continue to be functional.

Transmitting the notification can include broadcasting the notification to each downstream server in the multi-tier server architecture. Alternatively, transmitting the notification can include sending the notification to each requesting downstream server in the multi-tier server architecture. Additionally, transmitting the notification to each downstream server can be based on determining whether the number of requesting downstream servers exceeds a configurable threshold value.

In addition, one or more downstream servers can obtain content not existing on local servers from distant upstream servers. Transmitting requests for content and continuation messages through a multi-tier server architecture can improve large-scale deployment of live datastream broadcasting. Moreover, storing content in the local memory cache of servers downstream from an origin server can alleviate storage space constraints at downstream servers. For example, older content can be pushed out of the local memory cache when the memory cache reaches a configurable storage limit. The older content can be stored locally in a data storage device for future retrieval. Additionally, the size of the content file also can be configurable. Furthermore, broadcast subscriber experiences can be enhanced.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

FIG. 4 shows a flowchart of an example process for communicating between servers in a multi-tier server system.

Like reference numbers and designations in the various drawings indicate like elements.

DETAILED DESCRIPTION

Figure 1:
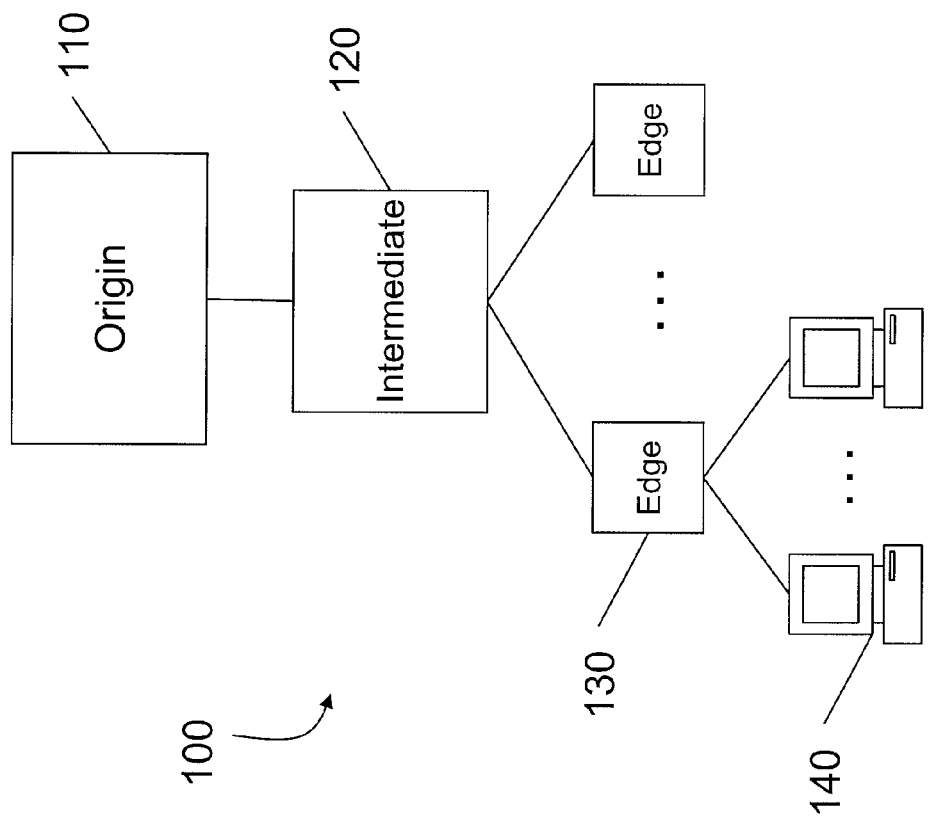
FIGS. 1-2 show examples of multi-tier server architectures.

FIG. 1 shows an example of a multi-tier server architecture 100. The multi-tier server architecture 100 includes multiple network nodes. The multi-tier server architecture 100 can be implemented to include three levels of servers 110-130 and client computers 140. The multi-tier server architecture 100 can be implemented to transmit a datastream to the client computers 140. The datastream can be a live datastream broadcast, a near-live feed, and/or a recorded datastream. The live datastream broadcast can include a plurality of segments. Each of the plurality of segments can include a plurality of video frames and/or audio samples. The plurality of segments can be transmitted as a near-live feed to servers 120, 130 and the client computers 140. In addition, the multi-tier server architecture 100 can be implemented to transmit a recorded datastream to the client computers 140. The recorded datastream can be formed by storing the plurality of segments. Three types of servers can reside in the multi-tier server architecture 100: an origin server 110; one or more intermediate servers 120; and one or more edge servers 130. In some implementations, the multi-tier server architecture 100 can be implemented in a static tree server structure. In a static tree server structure, downstream servers can transmit requests for content to directly connected upstream servers; downstream servers do not use efficiency algorithms to search for the 'best' upstream server. Servers more proximal to the origin server 110 are upstream servers. Servers that are more distal from the origin server 110 are downstream servers.

The origin server 110 resides at the top level of the multi-tier server architecture 100. The origin server 110 can act as an ingest server and can receive live video, audio and video/audio combinations for broadcast. The origin server 110 can obtain a live datastream including a plurality of segments. In some implementations, the origin server 110 can obtain the datastream by receiving the live data and segmenting the live data into the plurality of segments. In other implementations, the live data can already be segmented when the datastream is obtained by the origin server 110. The origin server 110 can transmit the segmented live datastream as a near-live feed to intermediate server 120 directly. The origin server 110 also can transmit the segmented live datastream as a near-live feed to the one or more edge servers 130 and client computers 140 directly and/or indirectly through communication network connections in the multi-tier server architecture 100. The live datastream, pre- and/or post-segmentation, can be recorded by a recording device operatively coupled to the origin server 110 and transferred to the origin server 110 via a communication port, i.e., USB, Bluetooth, Ethernet, wireless Ethernet. The live datastream can be stored at the origin server 110.

The intermediate server 120 can reside at the second level of the multi-tier server architecture 100. The intermediate server 120 is connected to the origin server 110 through a communication network connection. The intermediate server 120 can obtain content from the origin server 110. The obtained content can include the live datastream, the near-live feed and/or the recorded datastream. The intermediate server 120 can store at least a portion of the near-live feed and the recorded datastream locally. In some implementations, the intermediate server 120 can store the content in a memory cache of the intermediate server 120. As additional content is added to and stored in the intermediate server 120 memory cache, older content segments can be displaced when the capacity of the memory cache reaches a configurable storage limit. The intermediate server 120 can transmit the obtained content directly to one or more of the edge servers 130 and indirectly to the client computers 140 through the multi-tier server architecture 100. The intermediate server 120 can be implemented to transmit a request for content to the origin server 110.

The one or more edge servers 130 can reside at the third level of the multi-tier server architecture 100. The edge servers 130 are connected to the intermediate server 120 through a communication network connection. The edge servers 130 can obtain content from the intermediate server 120. The obtained content can include the live datastream, the near-live feed and/or the recorded datastream. The edge servers 130 can store at least a portion of the near-live feed and the recorded datastream locally. In some implementations, the edge server 130 can store the content in a memory cache of the edge server 130. As additional content is added to and stored in the edge server 130 memory cache, older content segments will be displaced when the capacity of the memory cache reaches a configurable storage limit. The edge servers 130 can transmit the obtained content directly to client computers 140. The edge servers 130 can be implemented to transmit a request for content to the intermediate server 120. In some implementations, the edge servers 130 can have the same functionalities as the intermediate server 120, and thus can be interchangeable with the intermediate server 120.

The client computers 140 are connected to the edge servers 130 through a communication network connection. The client computers 140 can obtain content from the edge servers 130. The obtained content can include the live datastream, the near-live feed and/or the recorded datastream. The client computers 140 can store at least a portion of the obtained content locally, e.g. in a buffer. The client computers 140 can be operated by users that can request the recorded datastream, the live datastream, and/or the near-live feed from the edge servers 130.

Figure 2:
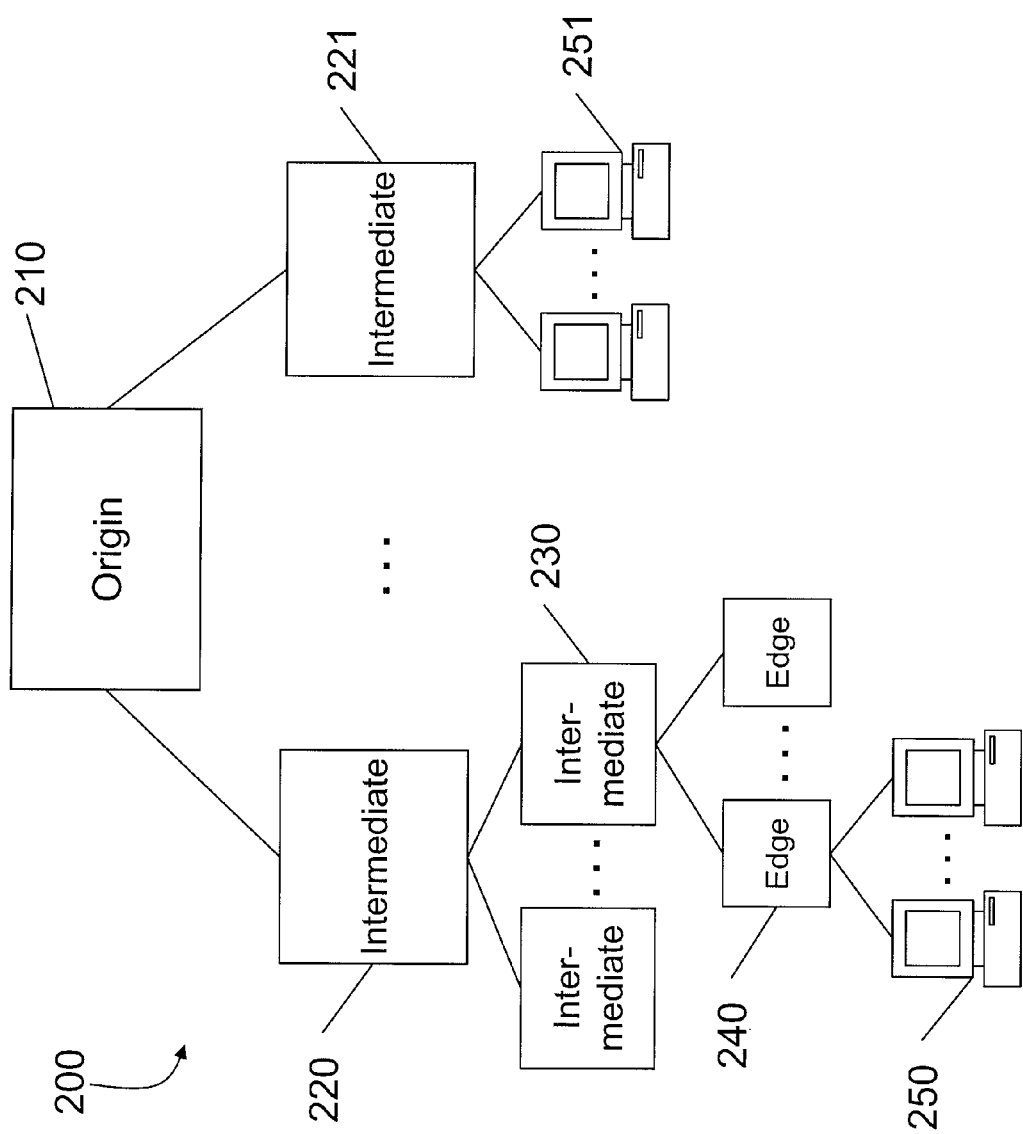

FIG. 2 shows an example of a multi-tier server architecture 200. The multi-tier server architecture 200 includes multiple network nodes. Network nodes 210-240 can be one or more server data processing apparatuses, e.g., computers, and network node 250 can be one or more client computers. The multi-tier server architecture 200 can be implemented to include more than three levels of servers. For example, the multi-tier server architecture 200 can be implemented to include an origin server 210 at the top level, one or more intermediate servers 220 at a second level, one or more intermediate servers 230 at a third level, one or more edge servers 240 at a fourth level and one or more client computers 250. The servers 210-240 and the client computers 250 are connected via communication network connections. Each server can selectively obtain, transmit and store content. Each client computer can selectively obtain, store, display and view content. Users at the client computers 250 can request content from the nearest server, e.g., one of the one or more edge servers 240.

In an alternative implementation, the multi-tier server architecture 200 can be implemented to include fewer than three levels of servers. For example, the multi-tier server architecture 200 can be implemented to include an origin server 210 at the top level, one or more intermediate servers 221 at a second level and one or more client computers 251. The servers 210 and 221 and the client computers 251 are connected via communication network connections. Users at the client computers 251 can request content from the intermediate server 221.

Figure 3A:
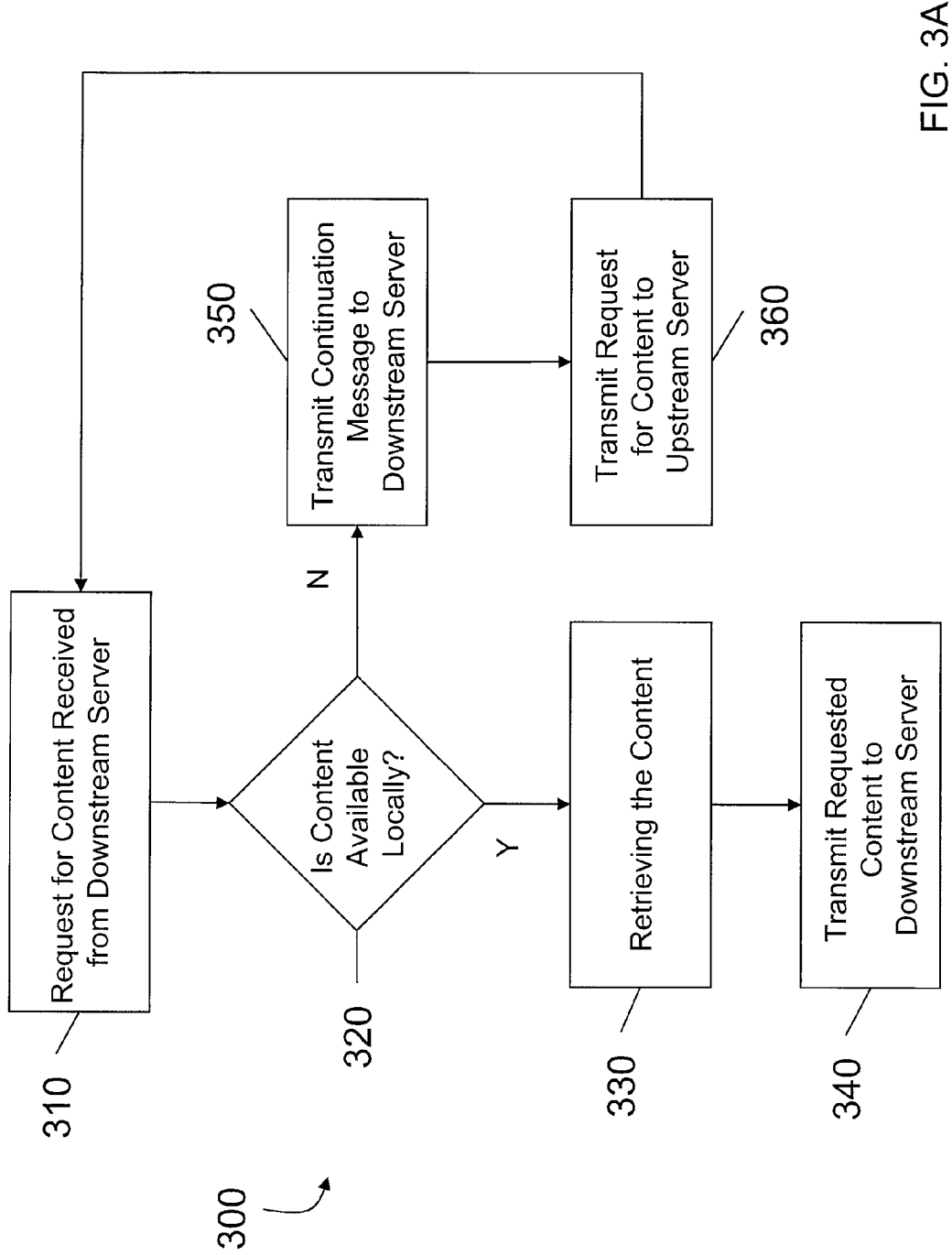
FIG. 3A shows a flowchart of an example process for obtaining content from an upstream server in a multi-tier server system.

FIG. 3A shows a flowchart of an example process 300 for obtaining content from an upstream server in a multi-tier server system. The process 300 can, for example, be implemented in the multi-tier server architectures 100, 200 depicted in FIGS. 1 and 2, respectively.

A request for content is received from a downstream server (310). The request can be transmitted from any of the one or more downstream servers in the multi-tier server architecture. For example, the request can be transmitted by an edge server and received at an intermediate server. Alternatively, the request can be transmitted by an intermediate server and received at an origin server. In some implementations, the origination of the request can be from one of the one or more client computers connected through a communication network connection to the multi-tier server architecture. The content can include live datastream broadcasts or recorded datastreams.

The server receiving the request for content determines if the content is available locally (320). In response to receiving the request, the server can determine if the content is available in a local data storage device. Alternatively, in response to receiving the request, the server can determine if the content is available in a local temporary storage location, e.g., a memory cache. The server receiving the request can be any of the one or more upstream servers in the multi-tier server architecture. For example, an edge server can receive the request from another downstream edge server. Alternatively, an intermediate server can receive the request from a downstream edge server.

If the server receiving the request for content determines that the content is available locally, the server retrieves the content (330). The server can retrieve the requested content when the server determines that the content is available in the local data storage device or in the local memory cache. For example, if an intermediate server determines that the requested content is available in its local memory cache, the intermediate server can retrieve the content. Alternatively, an origin server can determine that the requested content is available in its local data storage device and can retrieve the content.

After determining that the content is available locally, the server can transmit the requested content to the downstream server (340). The downstream server can receive the content from the server. In some implementations, the server can transmit the requested content to one or more downstream servers. For example, after determining that the requested content is available locally, an intermediate server can transmit the requested content to a requesting downstream edge server. The edge server can receive the transmitted content from the intermediate server and can store the transmitted content in a local data storage device or in a local memory cache. In response to obtaining the requested content, the edge server also can transmit the content to one or more other downstream nodes, e.g., edge servers and/or client computers in the communication network.

If the server receiving the request for content determines that the content is not available locally, the server transmits a continuation message to the downstream server (350). The server can transmit a continuation message to the requesting downstream server when the server determines that the content is not available in the local data storage device or in the local memory cache. The continuation message can serve as an unavailability notification and can inform the downstream server that the requested content is not available at the server receiving the request for the content. For example, if an intermediate server determines that the requested content is not available locally, the intermediate server can transmit the continuation message to a requesting downstream edge server.

In some implementations, the server can transmit a continuation message to one or more downstream servers when the server determines that the content is not available locally. For example, an intermediate server can transmit a continuation message to each downstream edge server that requests content from the intermediate server. In some other implementations, in response to determining that the requested content is not available locally, the server can broadcast a continuation message to each downstream server in the multi-tier server architecture. For example, an intermediate server can broadcast a continuation message to each downstream edge server, regardless if the downstream edge server requested content from the intermediate server. In some implementations, broadcasting the continuation message to each downstream can be based on a hybrid approach, which requires determining whether the number of downstream servers requesting the content exceeds a threshold value. For example, if the number of downstream edge servers requesting content from an intermediate server exceeds the threshold value of, e.g., five edge servers, then under the hybrid approach, the intermediate server can broadcast the continuation message to each of the downstream edge servers residing at any of the levels in the multi-tier server architecture.

Alternatively, if the number of downstream edge servers requesting content from an intermediate server is less than the threshold value, then the intermediate server can transmit the continuation message only to the requesting downstream edge servers. Thus, under the hybrid approach, the continuation message can be targeted to requesting downstream edge servers or can be broadcast to each of the downstream edge servers, depending on the number of downstream servers requesting the content. The threshold value can be configurable and can be set by a multi-tier server system administrator. Alternatively, the continuation message transmission algorithm can be defined statically and/or can be defined from an external data source.

After determining that the content is not available locally, the server can transmit a request for the content to an upstream server (360). The upstream server can receive the transmitted request for the content from the server. For example, after determining that the requested content is not available locally, an edge server can transmit a request for the content to an upstream intermediate server. The intermediate server can receive the transmitted request for the content from the edge server and can determine if the requested content is available locally, e.g., in a local data storage device or in a local memory cache of the intermediate server. If the requested content is available locally, the intermediate server can retrieve the requested content and also can transmit the requested content to the requesting downstream edge server.

If the requested content is not available locally at the intermediate server, the intermediate server can transmit a continuation message to the requesting downstream edge server and also can transmit another request for content to another upstream server, e.g., another intermediate server or the origin server.

Figure 3B:
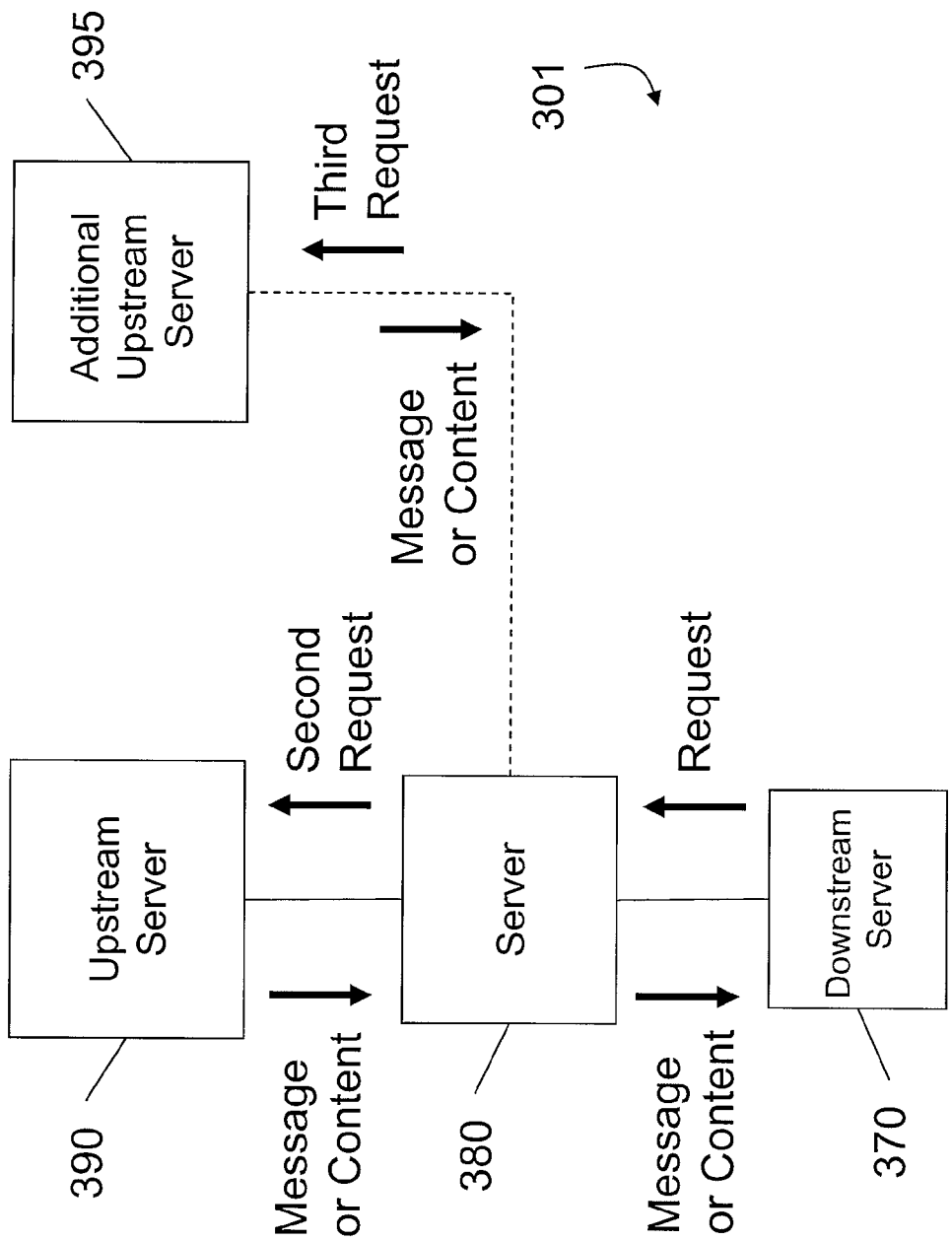
FIG. 3B shows a flowchart of an example process for transmitting requests and notifications in a multi-tier server system.

FIG. 3B shows a flowchart of an example process 301 for transmitting requests and notifications in a multi-tier server system. The process 301 can, for example, be implemented in the multi-tier server architectures 100, 200 depicted in FIGS. 1 and 2, respectively.

The process 301 describes a mechanism by which upstream and downstream servers can transmit requests for content and also can transmit continuation messages or the requested content in a multi-tier server architecture. A downstream server 370 can transmit a request for content that is not available locally to an upstream server, i.e., the server 380. The server 380 can receive the request for content from the downstream server 370. The server 380 can determine if the content is available locally, e.g., in a local data storage device or in a memory cache at the server 380. If the content is available locally at the server 380, the server 380 can transmit the requested content to the downstream server 370. However, if the content is not available locally at the server 380, the server 380 can transmit a continuation message to the requesting downstream server 370 informing the downstream server 370 that the content is not available locally. The continuation message from the server 380 also can inform the downstream server 370 that the server 380 is transmitting a second request for the content to an upstream server 390.

The upstream server 390 can receive the second request for content from the server 380. The upstream server 390 can determine if the content is available locally, e.g., in a local data storage device or in a memory cache at the upstream server 390. If the content is available locally at the upstream server 390, the upstream server 390 can transmit the requested content to the server 380. However, if the content is not available locally at the upstream server 390, the upstream server 390 can transmit a continuation message to the requesting server 380 informing the server 380 that the content is not available locally. The continuation message from the upstream server 390 also can inform the server 380 that the upstream server is transmitting another request for the content to another upstream server. The mechanism by which a downstream server can request content from an upstream server and the upstream server can transmit either the requested content or a continuation message to the downstream server can continue until the requested content is determined to be available locally at an upstream server.

In some implementations, the continuation message from the server 380 can be transmitted to the downstream server 370 periodically, e.g., every two seconds, to prevent the downstream server 370 from experiencing a time out failure while waiting for the requested content. The time out failure can include a specified period of time that will be allowed lapse in a server or system before a specified event is to take place, unless another specified event occurs first. For example, the downstream server 370 will wait a prescribed amount of time to receive either the requested content or the continuation message from the server 380 before the downstream server 370 transmits another request to another upstream server. The downstream server 370 also can alert a multi-tier server architecture overview computer system that the server 380 did not transmit either the requested content or the continuation message within the time out failure limit. The server 380 also can be prevented from experiencing a time out failure while waiting for the requested content by receiving a continuation message from the upstream server 390. The time out failure limit of each of the servers 370, 380 and 390 can be configurable and can be set to any value. For example, the time out failure limit of the server 380 can be set at, e.g., 0.5 seconds, five seconds or ten seconds.

In some implementations, the server 380 can transmit a continuation message to the downstream server 370 upon receiving a continuation message from the upstream server 390. Receiving a continuation message from the upstream server 390 triggers the server 380 to transmit a continuation message downstream to the downstream server 370. As each continuation message is transmitted downstream, each respective server that receives a continuation message can be prevented from experiencing a time out failure. Thus, the server 380 can relay requests for content to the upstream server 390 and can relay continuation messages to the downstream server 370. The server 380 can continue to relay continuation messages from the upstream server 390 to the downstream server 370 until the upstream server 390 either retrieves or obtains the requested content and transmits the requested content to the server 380. The server 380 can then transmit the requested content to the downstream server 370 instead of transmitting the continuation message to the downstream server 370. Each respective upstream server 390 can send its own request upstream until an upstream server is found that has the requested content available. Due to the nature of the multi-tier server architecture, the origin server is the last upstream server to receive a request for content from a downstream server. The origin server can transmit the requested content to one or more downstream servers upon obtaining the requested content.

In some implementations, the server 380 can transmit a continuation message to each requesting downstream server 370. In some other implementations, the server 380 can broadcast a continuation message to each downstream server in the multi-tier server architecture. The difference between transmitting a continuation message to each requesting downstream server 370 and broadcasting the continuation message to each downstream server can be based on whether the number of requesting downstream servers 370 exceeds a threshold value. The threshold value can be configurable and can be set by, e.g., the multi-tier server system administrator. For example, when the threshold value is set to five, if the server 380 receives requests for content from more than five downstream servers 370, the server 380 can broadcast the continuation message through the communication network to each downstream server in the multi-tier server architecture informing each downstream server that the content is not available locally at the server 380. However, if the server 380 receives requests for content from less than five downstream servers 370, the server 380 can transmit a continuation message to each requesting downstream server 370 informing each downstream server 370 that the content is not available locally at the server 380.

However, in response to determining that the requested content is available locally at the server 380, the server can retrieve the content and can transmit the requested content downstream through the communication network to the requesting downstream server 370. The downstream server 370 can store the requested content locally and can transmit the requested content downstream through the communication network to one or more requesting client computers. The client computers can selectively receive, store, display and view the content on a display device operatively coupled to the client computer.

In some implementations, if the server 380 does not receive the requested content or the continuation message from the upstream server 390 within a prescribed time limit, the server 380 can send an additional request, i.e., a third request, for the content to an additional upstream server 395. The prescribed time limit can be the configurable time out failure limit for the server 380. The configurable time out failure limit can be set to any value. For example, if the upstream server 390 does not transmit the requested content or a continuation message to the server 380 within the configurable time out failure limit of, e.g., ten seconds, the server 380 can transmit a third request for content to the additional upstream server 395. The additional upstream server 395 can determine if the requested content is available locally, e.g., in a local data storage device or in a memory cache at the additional upstream server 395. If the content is available locally, the additional upstream server 395 can transmit the requested content to the server 380. The server 380 can store the requested content locally and also can transmit the requested content to the requesting downstream server 370.

In addition to transmitting the third request for content to the additional upstream server 395, the server 380 also can transmit a notification to, e.g., a multi-tier server architecture overview computer system. The computer system can receive the notification(s) from the server 380, can monitor the communication network connections of the multi-tier server architecture, can alert the multi-tier server system administrator to server failure problems as necessary, and can re-route network traffic and/or reconfigure the network. The alert from the computer system can inform the system administrator that the upstream server 390 has not transmitted either the requested content and/or the continuation message within the time out failure limit of the server 380. The alert from the computer system can indicate that the upstream server 390 has ceased to operate and is a failed device. By transmitting a notification to the computer system, the server 380 can inform the system administrator that the upstream server 390 is non-responsive and can pinpoint the precise upstream server 390 in the multi-tier server architecture that has failed. Upon receiving the notification, the computer system can implement failover to a functional upstream server, can replace the non-responsive upstream server 390 with a functional upstream server, i.e., the additional upstream server 395, and/or can re-route the communication network connections within the multi-tier server architecture to circumvent the non-responsive and/or failed upstream server 390.

Servers that cease, or fail, to transmit the requested content and the continuation notification within the prescribed time out failure limit of the downstream server can be identified as failed servers. The computer system can implement failover upon identifying a server that fails to transmit the requested content or the continuation notification within the time out failure limit of the downstream server. Failover can include the capability to switch over automatically to a redundant or standby computer server, system or network upon the failure or abnormal termination, i.e., non-responsiveness, of a previously active server, system or network. For example, the multi-tier server architecture overview computer system can switch over to the additional upstream server 395 automatically upon detecting that the upstream server 390 is non-responsive. The computer system also can isolate the failed network connections so that the remainder of the network connections can continue to be operational. Failover can occur without human intervention or with manual approval.

In some implementations, the computer system can notify the downstream server 370 and/or client computers that the upstream server 390 has failed. The notification to downstream servers and/or client computers can occur without implementing failover to a functional server. Moreover, informing the computer system that the upstream server 390 is non-responsive can enable the computer system to isolate failed network connections in the multi-tier server architecture. Therefore, if the computer system implements failover to a functional server, the remainder of the network connections will continue to be functional.

FIG. 4 shows a flowchart of an example process 400 for communicating between servers in a multi-tier server system. The process 400 can, for example, be implemented in the multi-tier server architectures 100, 200 depicted in FIGS. 1 and 2, respectively.

A first request for content can be received at a server (405). The server can be any server within the multi-tier server architecture that is connected to a downstream node. The node can be a server computer and/or a client computer. The request can be transmitted by a downstream server or client computer.

Whether the content is available locally at the server can be determined (410). The server can determine whether the content is available in a local data storage device within, or operatively coupled to the server. The server can determine whether the content is available in a local memory cache.

The content can be retrieved when the content is available locally (415). The server can retrieve the content when the content is available in the local data storage device or in the local memory cache.

The content can be transmitted to at least one downstream server when the content is available locally (420). The server can transmit the content to one or more downstream servers through the multi-tier server architecture communication network connections. The one or more downstream servers can receive the content and can store the content locally.

A notification that the content is not available locally and that a second request for the content is being transmitted can be transmitted to at least one downstream server when the content is not available locally (425). The server can transmit the notification that the content is not available locally and that a second request for the content is being transmitted. The notification that the content is not available locally and that a second request for the content is being transmitted can be transmitted to one or more downstream servers. In some implementations, the notification can be transmitted to each downstream server requesting the content. In some other implementations, the notification can be broadcast to each downstream server in the multi-tier server architecture.

A second request for the content can be transmitted to at least one upstream server when the content is not available locally (430). The server can transmit a second request for the content. The second request for the content can be transmitted by the server to at least one upstream server. If the requested content is available at the upstream server, the upstream server can transmit the requested content downstream to the server. The server can store the requested content locally and can transmit the content to one or more requesting downstream servers.

Figure 5:
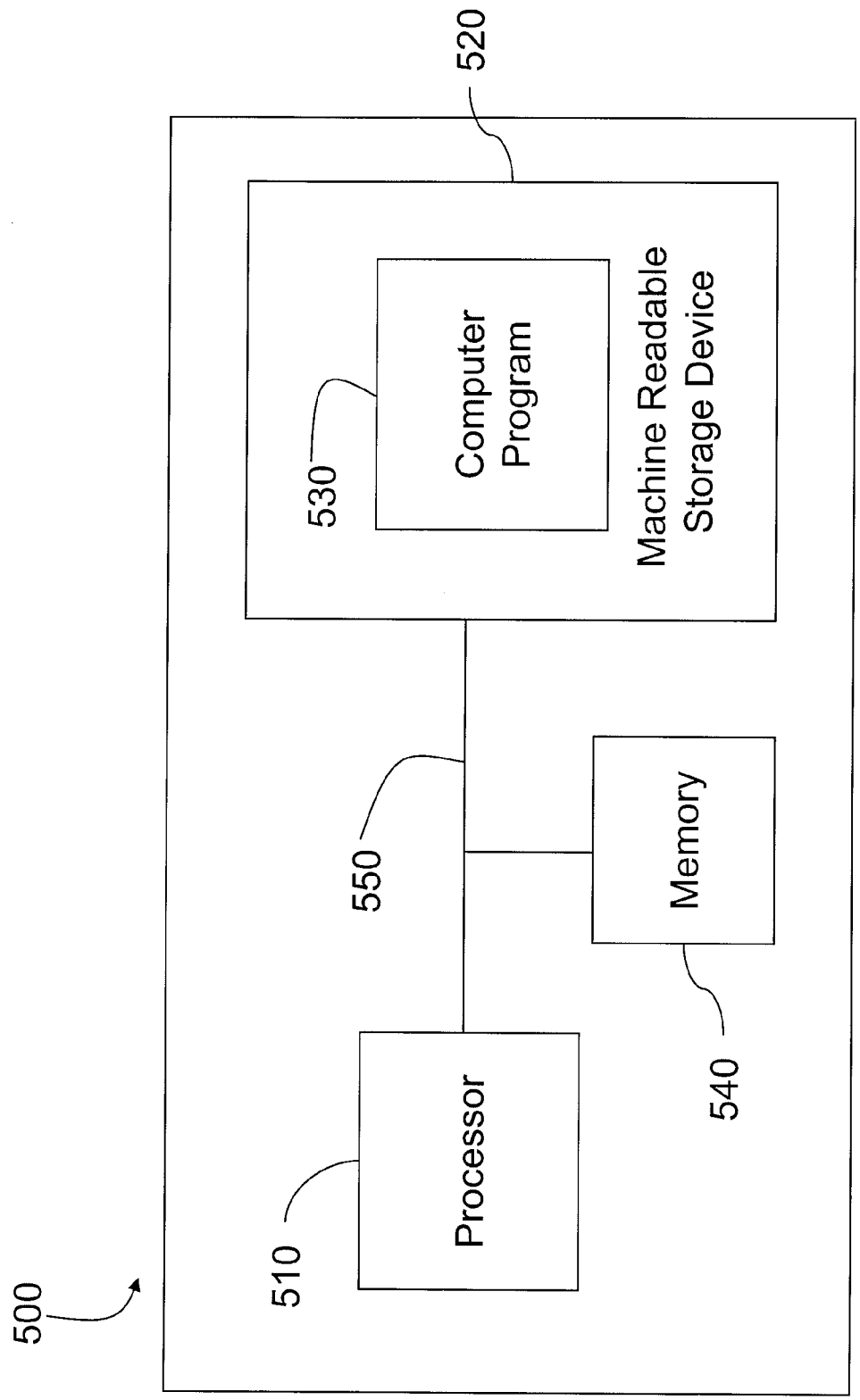
FIG. 5 shows a schematic diagram of an example computer system that can be utilized to implement the systems and methods described herein.

FIG. 5 is a schematic diagram of an example computer system 500 that can be utilized to implement the systems and methods described herein. The system 500 includes a processor 510, a machine-readable storage device 520, a computer program 530, and a memory 540. Each of the components 510, 520, 530, and 540 can, for example, be interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 540 or on the machine-readable storage device 520.

The memory 540 stores information within the system 500. In some implementations, the memory 540 is a volatile memory unit. In some implementations, the memory 540 is a non-volatile memory unit. The machine-readable storage device 520 is capable of providing mass storage for the system 500. In various implementations, the machine-readable storage device 520 can, for example, include a hard disk device, an optical disk device, or some other large capacity storage device.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them.

A computer program (also known as a program, software, software application, script, or code) can be written in any form of programming language, including compiled or interpreted languages, declarative or procedural, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results.

What is claimed is:

1. A computer-implemented method comprising:
    receiving, at hardware including one or more processors and one or more memory devices effecting a server, a first request for content;
    determining whether the content is available locally at the server;
    when the content is available locally at the server,
        retrieving the content locally at the server; and
        transmitting the content to at least one downstream server; and
    when the content is not available locally at the server,
        transmitting, to the at least one downstream server, a notification that the content is not available locally and that a second request for the content is being transmitted; and
        transmitting the second request for the content to at least one upstream server;
    transmitting a third request for the content to another server when neither the content nor a notification that the content is not available locally is transmitted by the at least one upstream server within a time out failure limit of the server receiving the first request for content; and
    transmitting a notification identifying the at least one upstream server that failed to transmit within the time out failure limit of the server receiving the first request for content.

2. The computer-implemented method of claim 1, further comprising, when the content is not available locally at the server:
    transmitting, periodically, additional notifications to the at least one downstream server until the content is retrieved.

3. The computer-implemented method of claim 2, wherein transmitting the additional notifications occurs to prevent a time out failure at the at least one downstream server.

4. The computer-implemented method of claim 1, wherein the at least one upstream server is more proximal to an origin server than the server receiving the first request for content.

5. The computer-implemented method of claim 4, wherein the at least one upstream server includes the origin server.

6. The computer-implemented method of claim 4, wherein the at least one downstream server is more distal from the origin server than the server receiving the first request for content.

7. The computer-implemented method of claim 1, wherein transmitting the notification that the content is not available locally includes transmitting the notification to each downstream server requesting the content from the server.

8. The computer-implemented method of claim 1, wherein transmitting the notification that the content is not available locally includes broadcasting the notification to downstream servers.

9. The computer-implemented method of claim 1, wherein transmitting the notification that the content is not available locally comprises:
   broadcasting the notification that the content is not available locally to downstream servers if a number of downstream servers requesting the content from the server exceeds a threshold value; and
   transmitting the notification that the content is not available locally to each requesting downstream server individually if the threshold value is not exceeded.

10. The computer-implemented method of claim 1, wherein transmitting a notification identifying the at least one upstream server that failed to transmit comprises transmitting to a multi-tier server architecture overview computer system configured to alert a system administrator and re-route network traffic.

11. The computer-implemented method of claim 9, wherein the threshold value is a configurable value.

12. A non-transitory computer-readable storage medium encoding a computer program product operable to cause data processing apparatus to perform operations comprising:
   receiving, at a server, a first request for content;
   determining whether the content is available locally at the server;
   when the content is available locally at the server,
      retrieving the content locally at the server; and
      transmitting the content to at least one downstream server; and
   when the content is not available locally at the server,
      transmitting, to the at least one downstream server, a notification that the content is not available locally and that a second request for the content is being transmitted; and
      transmitting the second request for the content to at least one upstream server;
   transmitting a third request for the content to another server when neither the content nor a notification that the content is not available locally is transmitted by the at least one upstream server within a time out failure limit of the server receiving the first request for content; and
   transmitting a notification identifying the at least one upstream server that failed to transmit within the time out failure limit of the server receiving the first request for content.

13. The non-transitory computer-readable storage medium of claim 12, the operations further comprising, when the content is not available locally at the server:
   transmitting, periodically, additional notifications to the at least one downstream server until the content is retrieved.

14. The non-transitory computer-readable storage medium of claim 13, wherein transmitting the additional notifications occurs to prevent a time out failure at the at least one downstream server.

15. The non-transitory computer-readable storage medium of claim 12, wherein the at least one upstream server is more proximal to an origin server than the server receiving the first request for content.

16. The non-transitory computer-readable storage medium of claim 15, wherein the at least one upstream server includes the origin server.

17. The non-transitory computer-readable storage medium of claim 15, wherein the at least one downstream server is more distal from the origin server than the server receiving the first request for content.

18. The non-transitory computer-readable storage medium of claim 12, wherein transmitting the notification that the content is not available locally includes transmitting the notification to each downstream server requesting the content from the server.

19. The non-transitory computer-readable storage medium of claim 12, wherein transmitting the notification that the content is not available locally includes broadcasting the notification to downstream servers.

20. The non-transitory computer-readable storage medium of claim 12, the operations further comprising:
   broadcasting the notification that the content is not available locally to downstream servers if a number of downstream servers requesting the content from the server exceeds a threshold value; and
   transmitting the notification that the content is not available locally to each requesting downstream server individually if the threshold value is not exceeded.

21. The non-transitory computer-readable storage medium of claim 12, wherein transmitting a notification identifying the at least one upstream server that failed to transmit comprises transmitting to a multi-tier server architecture overview computer system configured to alert a system administrator and re-route network traffic.

22. The non-transitory computer-readable storage medium of claim 20, wherein the threshold value is a configurable value.

23. A system comprising:
   one or more nodes in a network; and
   hardware including one or more processors and one or more memory devices effecting at least one server configured to perform operations, comprising:
      receiving, at the server, a first request for content;
      determining whether the content is available locally at the server;
      when the content is available locally at the server,
         retrieving the content locally at the server; and
         transmitting the content to at least one downstream server; and
      when the content is not available locally at the server,
         transmitting, to the at least one downstream server, a notification that the content is not available locally and that a second request for the content is being transmitted; and
         transmitting the second request for the content to at least one upstream server;
   transmitting a third request for the content to another server when neither the content nor a notification that the content is not available locally is transmitted by the at least one upstream server within a time out failure limit of the server receiving the first request for content; and
   transmitting a notification identifying the at least one upstream server that failed to transmit within the time out failure limit of the server receiving the first request for content.

24. The system of claim 23, wherein the operations further comprise, when the content is not available locally at the server:
   transmitting, periodically, additional notifications to the at least one downstream server until the content is retrieved.

25. The system of claim 24, wherein transmitting the additional notifications occurs to prevent a time out failure at the at least one downstream server.

26. The system of claim 23, wherein the at least one upstream server is more proximal to an origin server than the server receiving the first request for content.

27. The system of claim 26, wherein the at least one upstream server includes the origin server.

28. The system of claim 26, wherein the at least one downstream server is more distal from the origin server than the server receiving the first request for content.

29. The system of claim 23, wherein transmitting the notification that the content is not available locally includes transmitting the notification to each downstream server requesting the content from the server.

30. The system of claim 23, wherein transmitting the notification that the content is not available locally includes broadcasting the notification to downstream servers.

31. The system of claim 23, wherein the operations further comprise:
 broadcasting the notification that the content is not available locally to downstream servers if a number of downstream servers requesting the content from the server exceeds a threshold value; and
 transmitting the notification that the content is not available locally to each requesting downstream server individually if the threshold value is not exceeded.

32. The system of claim 23, wherein transmitting a notification identifying the at least one upstream server that failed to transmit comprises transmitting to a multi-tier server architecture overview computer system configured to alert a system administrator and re-route network traffic.

33. The system of claim 31, wherein the threshold value is a configurable value.

* * * * *